United States Patent
Kamity et al.

(10) Patent No.: US 7,519,004 B1
(45) Date of Patent: Apr. 14, 2009

(54) LOOPBACK TESTING OF A NETWORK INTERFACE DEVICE FROM A USER-SPACE SOFTWARE LAYER

(75) Inventors: Kiran Kamity, Sunnyvale, CA (US); Hong Huang, San Jose, CA (US)

(73) Assignee: Netowrk Appliance, Inc., Sunnyvale, CA (US)

( * ) Notice: Subject to any disclaimer, the term of this patent is extended or adjusted under 35 U.S.C. 154(b) by 596 days.

(21) Appl. No.: 11/061,168

(22) Filed: Feb. 18, 2005

(51) Int. Cl.
*H04L 12/26* (2006.01)
(52) U.S. Cl. .......................... 370/248; 370/249
(58) Field of Classification Search ................. 370/241, 370/249, 245, 248, 401
See application file for complete search history.

(56) References Cited

U.S. PATENT DOCUMENTS

2005/0220033 A1 * 10/2005 DelRegno et al. ........... 370/249
2005/0265241 A1 * 12/2005 Makowski et al. .......... 370/241
2006/0045021 A1 * 3/2006 Deragon et al. ............. 370/249
2006/0126647 A1 * 6/2006 Hicks, III .................... 370/401

OTHER PUBLICATIONS

Harry Newton, Feb. 2002, CMP books, 18th Edition, p. 504, NAT.*
Harry Newton, Feb. 2002, CMP books, 18th Edition, p. 592, promiscuous mode.*

* cited by examiner

*Primary Examiner*—Andrew Lee
(74) *Attorney, Agent, or Firm*—Blakely, Sokoloff, Taylor & Zafman LLP.

(57) ABSTRACT

A loopback test of the datalink layer of a network interface device is performed from a user-space software layer. In certain embodiments, network address translation rules in the network layer are modified to change source and destination network addresses of a test packet to a fake IP address, to enable the test packet to be forwarded from the network layer to the datalink layer.

46 Claims, 7 Drawing Sheets

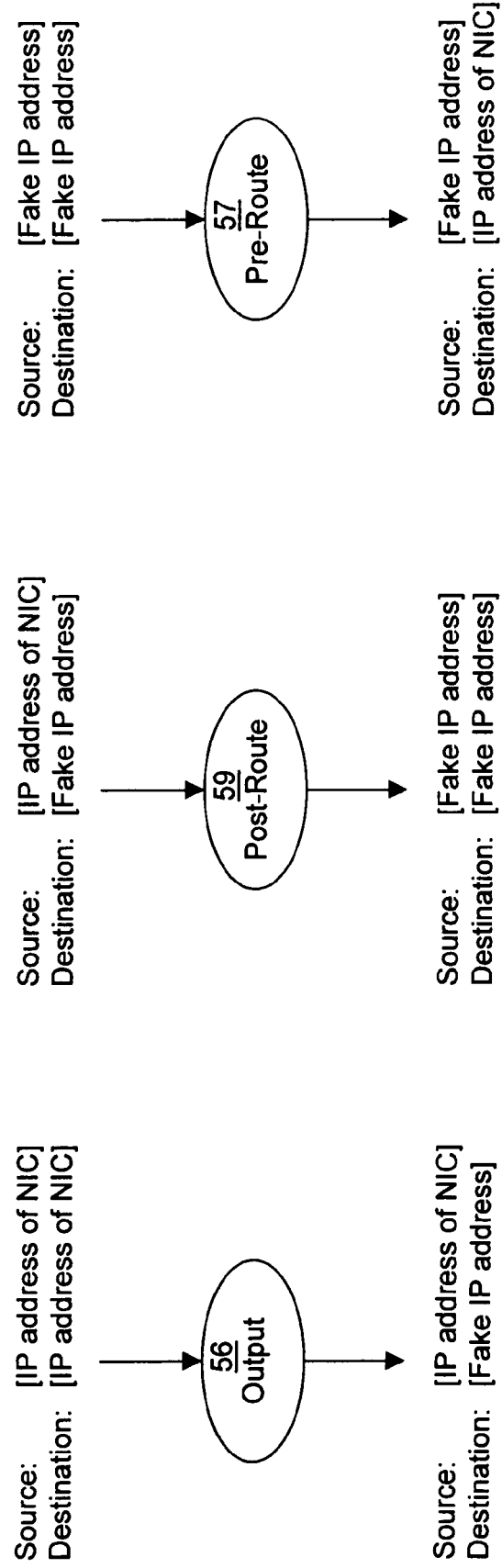

LOOPBACK TESTING OF A NETWORK INTERFACE DEVICE FROM A USER-SPACE SOFTWARE LAYER

FIELD OF THE INVENTION

At least one embodiment of the present invention pertains to loopback testing of a network interface device, and more particularly, to loopback testing of a network interface device from a user-space software layer.

BACKGROUND

Manufacturers of various types of network-connectable devices may require or desire the ability to test the functionality of a network interface, such as an Ethernet network interface card (NIC). The datalink layer and physical (PHY) layer circuitry of a network interface are sometimes collectively called the "hardware layer". One of the most common ways to test the hardware layer of a network interface is by a loopback test. In a loopback test, a cable is connected from the output to the input of the network interface. Data is then sent out of the network interface, and the loopback cable sends this data back into the network interface.

This type of test can be performed by setting up a TCP server on the device under test (DUT) that listens on a particular port. A client program attempts a TCP connection to the DUT's IP address, and sends the data. When the server program receives this data, it performs a checksum comparison to validate the integrity of the data, and therefore, the functionality of the DUT's hardware layer. If the data received matches the data sent, the DUT (the network interface) is considered to be functional.

It is desirable to be able to initiate a hardware layer loopback test from user-space software, e.g., from test software operating logically above the operating system. However, certain operating systems, such as Linux version 2.4, do not allow a Transport Control Protocol/Internet Protocol (TCP/IP) packet to be passed down to the hardware layer if the packet is destined for one of the host machine's own IP addresses. Instead, when the operating system receives such a packet from the user-space software, the operating system performs a software loopback within its IP layer. Thus, Linux version 2.4 and other operating systems which operate in this way are not designed to allow a hardware layer loopback test of a network interface.

One way to avoid this problem, assuming such an operating system is to be used, would be to modify the operating system kernel code to bypass or disable the software loopback functionality. However, changing the operating system kernel code can be time-consuming and costly. Furthermore, this approach tends to complicate the manufacturing process, because the manufacturer would then have multiple kernels to manage, i.e., one for regular use in its products, and one for running its manufacturing testing tools.

Another possible approach would be to connect the DUT to a separate test host machine and send data back and forth between these machines to verify the DUT's hardware layer functionality. However, this method is also expensive, since it requires a test host for each DUT, and it does not scale well in a typical manufacturing setup due to cost and manufacturing bench space limitations. Furthermore, this approach is not true loopback testing of the DUT, since the data must travel to a separate host on the network before being sent back to the DUT.

SUMMARY OF THE INVENTION

The present invention includes a method for testing a network interface device, where the method includes using a user-space software layer to cause a loopback test of the datalink layer of the network interface device, and using the user-space software layer to determine a result of the loopback test.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 6 shows the result of modifying the output chain of the network address translation (NAT) IP table of the network layer of the operating system kernel;

FIG. 7 shows the result of modifying the post-routing chain of the NAT IP table;

FIG. 8 shows the result of modifying the pre-routing chain of the NAT IP table.

DETAILED DESCRIPTION

A method and apparatus to perform hardware layer loopback testing of a network interface device from user-space software are described. The described technique can be employed with a Linux operating system or other operating system that normally performs internal software loopback of packets destined for the local host's own IP address. As such, the described technique provides a very easy way to perform hardware layer loopback of a network interface from a user-space program, without involving any change to the operating system kernel code or involving a separate test host.

Figure 1:
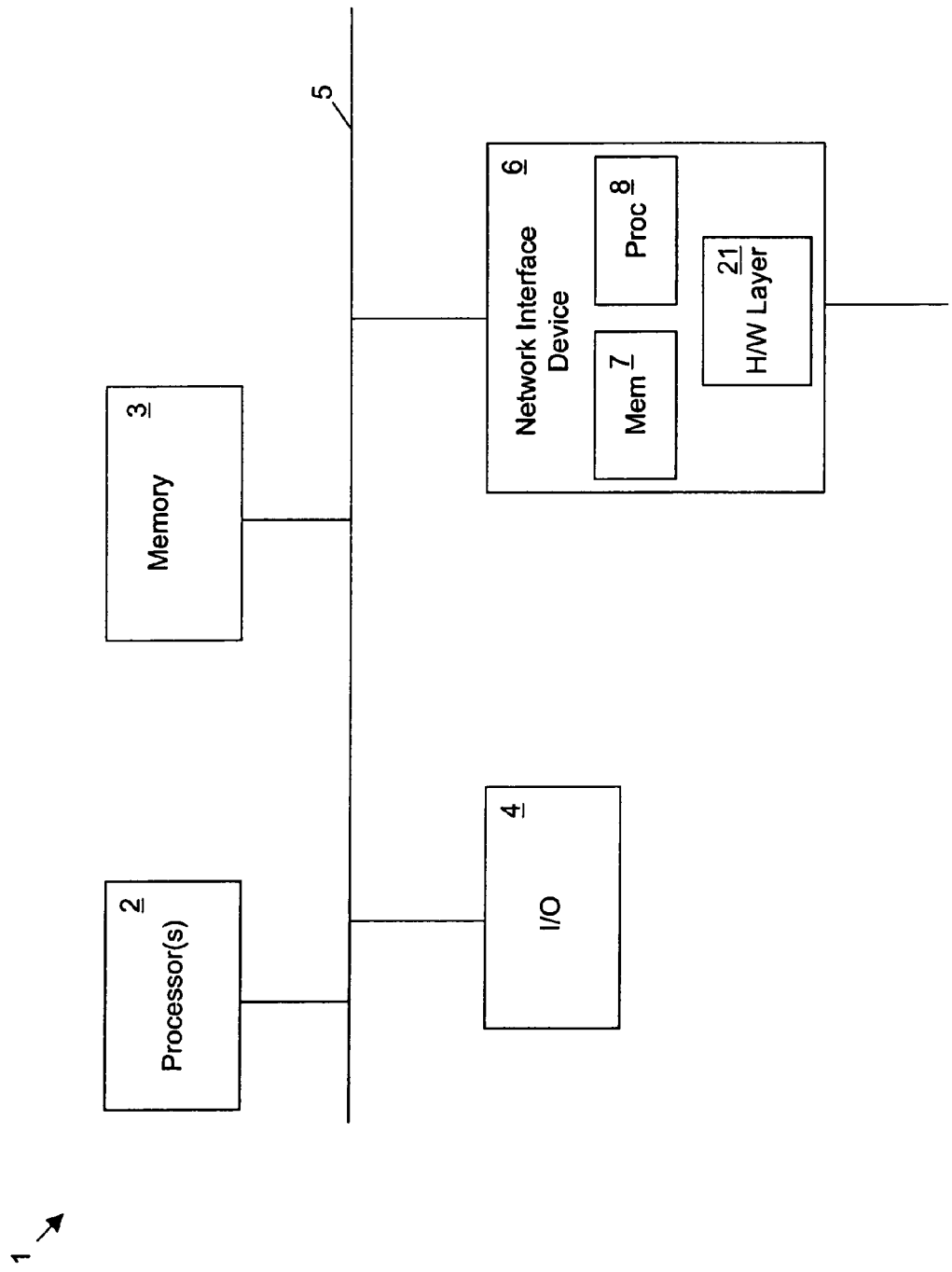
FIG. 1 is a high-level block diagram of a network-connectable processing system, which includes a network interface device.

Refer now to FIG. 1, which shows a high-level block diagram of a network-connectable processing system, which includes a network interface device that may be tested using the technique described herein. The processing system 1 may be, for example, a conventional personal computer (PC) or server-class computer, a special-purpose storage system such as a file server, or any other type of processing system designed to be able to communicate over a network. Note that FIG. 1 is a conceptual representation which represents any of numerous possible specific physical arrangements of hardware components; however, the details of such arrangements are not germane to the present invention and are well within the knowledge of those skilled in the art.

As illustrated, the processing system 1 includes one or more processors 2, memory 3, and one or more input/output (I/O) devices 4, all coupled to each other through a bus system 5. Also connected to the bus system 5 is a network interface device 6. The bus system 5 includes one or more buses or other physical connections, which may be connected to each other through various bridges, controllers and/or adapters such as are well-known in the art. For example, the bus system 5 may include a "system bus", which may be connected through one or more adapters to one or more expansion buses, such as a Peripheral Component Interconnect (PCI) bus, PCI-Express bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire"). In alternative embodiments, some or all of the aforementioned components may be connected to each other directly, rather than through a bus system.

The network interface device 6 may be or may include, for example, a network interface card (NIC), and more specifically, it may be or include an Ethernet NIC. The network interface device 6 includes network hardware layer (i.e., datalink and PHY layer) circuitry 21 and further may include (as shown) its own dedicated processor 7 and memory 8. Accordingly, in certain embodiments of the invention the network interface device 6 includes its own separate operating system, although that is not necessarily so for purposes of implementing the loopback testing technique introduced herein. Similarly, in certain embodiments the network interface device 6 includes its own (user-space) test software, which may be used to initiate loopback testing, although that also is not necessarily so for purposes of implementing the technique described herein.

Each of processors 2 and 8 may be or may include one or more programmable general-purpose or special-purpose microprocessors or digital signal processors (DSPs), microcontrollers, application specific integrated circuits (ASICs), programmable logic devices (PLDs), or a combination of such devices. Each of memories 3 and 7 may be or may include read-only memory (ROM), which may be programmable (e.g., Flash), random access memory (RAM), or a combination of any of various forms of RAM or ROM.

Figure 2:
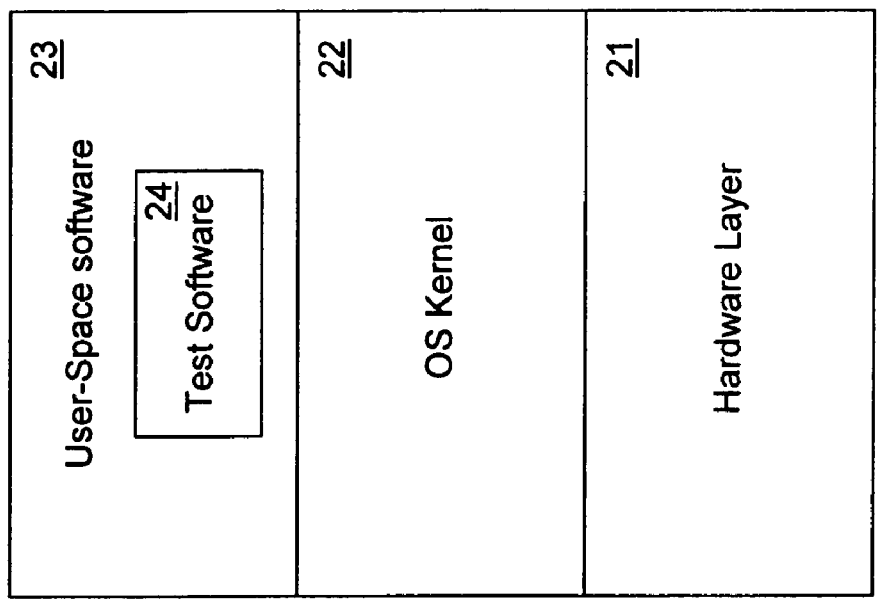
FIG. 2 shows the logical relationship between the hardware layer of the network interface device and software used to perform hardware layer loopback testing.

FIG. 2 shows the logical relationship between the hardware layer of the network interface device and the software which is used to perform hardware layer loopback testing according to the technique introduced herein. For purposes of this description, the "hardware layer" or "network hardware layer" means collectively the datalink circuitry and physical layer (PHY) circuitry of a network interface device. In FIG. 2, at least the hardware layer 21 is part of the network interface device 6.

The software includes an operating system kernel 22 and a user-space software layer 23. The operating system kernel operates logically on top of the hardware layer. The user-space software layer 23 includes test software 24 that can be used, among other purposes, to initiate loopback testing of the hardware layer 21 and to evaluate the results of such testing.

The operating system kernel 22 and the test software 24 each may reside in either the dedicated memory 7 of the network interface device 6 or in the memory 3 of the host processing system 1. As noted above, the network interface device 6 may include its own separate operating system kernel, although not necessarily. Likewise, the network interface device 6 may include its own separate test software, although not necessarily. Thus, in certain embodiments, both the test software 24 and the operating system kernel 22 reside in the memory 3 of the host processing system 1, not on the network interface device 6. In other embodiments, both the test software 24 and the operating system kernel 22 reside in the local memory 7 in the network interface device 6. In still other embodiments, the test software 24 resides in memory 3 of the host processing system 1, while the kernel 22 operates locally on the network interface device 6 (of course, in that case the host processing system 1 also generally would include its own operating system, separate from operating system kernel 22).

Figure 3:
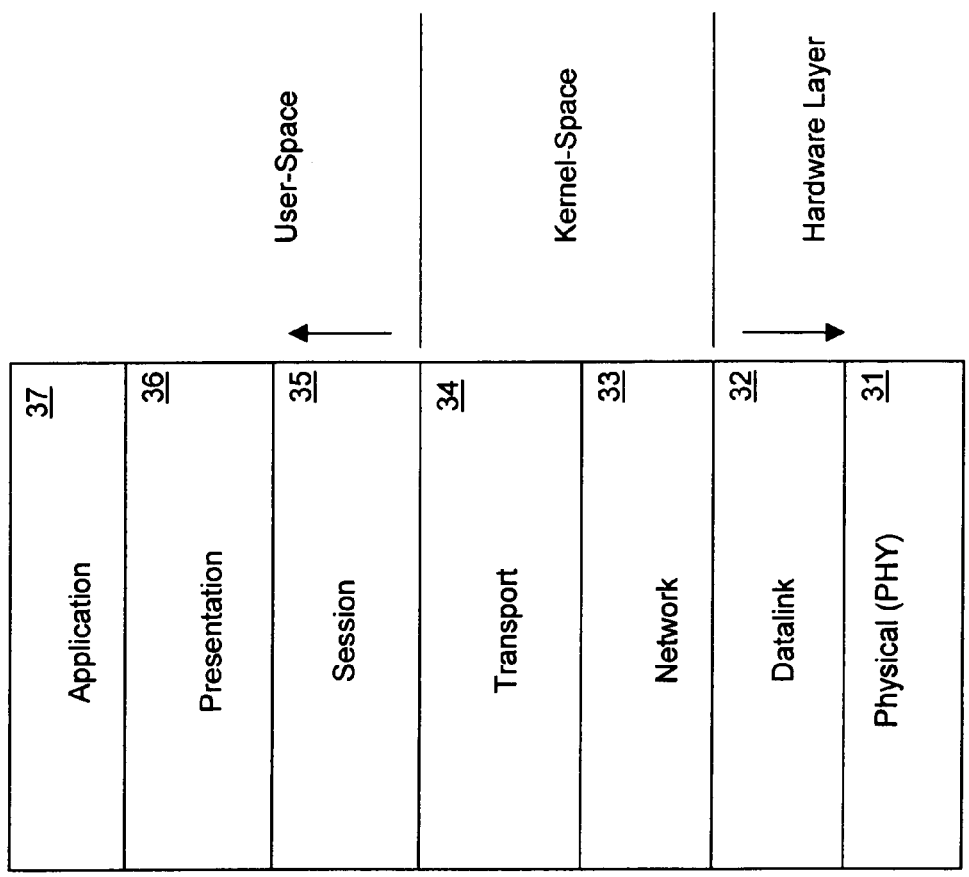
FIG. 3 illustrates the layers of the ISO/OSI architecture with respect to user-space, kernel-space, and hardware layer.

It is useful now to define certain nomenclature used in this document. As is well-known, the International Organizations for Standardization Open Systems Interconnection (ISO/OSI) reference model defines a layered architecture for devices exchanging information through a network. As shown in FIG. 3, the layered architecture includes, from the lowest level to the highest level (logically): a physical (PHY) layer 31, a datalink layer 32, a network layer 33, a transport layer 34, a session layer 35, presentation layer 36, and an application layer 37. The functionality and possible physical implementations of these layers are well-known in the art and need not be discussed herein. Nonetheless, in at least one embodiment of the invention, the datalink layer 32 implements Ethernet, while the network layer 33 implements IP and the transport layer 34 implements TCP. The circuitry which implements the datalink layer 32 and PHY layers 31 resides on the network interface device 6 and is collectively referred to herein as the "network hardware layer" or simply the "hardware layer" of the network interface device 6, and is shown as hardware layer 21 in FIG. 2. The transport layer 34 and network layer 33 are implemented in "kernel space", i.e., they are implemented by the operating system kernel 22. All layers above the transport layer 34 (e.g., the session layer 35, presentation layer 36, and application layer 37) are referred to as "user-space" layers, and the programs which implement these layers are referred to as "user-space" programs or "user-space" software.

Figure 4B:
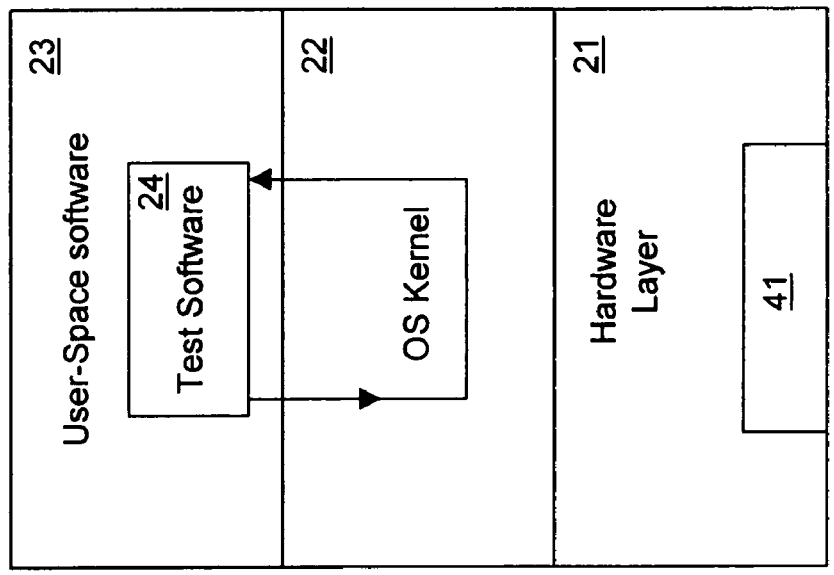
FIG. 4B illustrates the result of attempting a hardware layer loopback test from user-space software with a Linux 2.4 kernel, without the present invention.
Figure 4A:
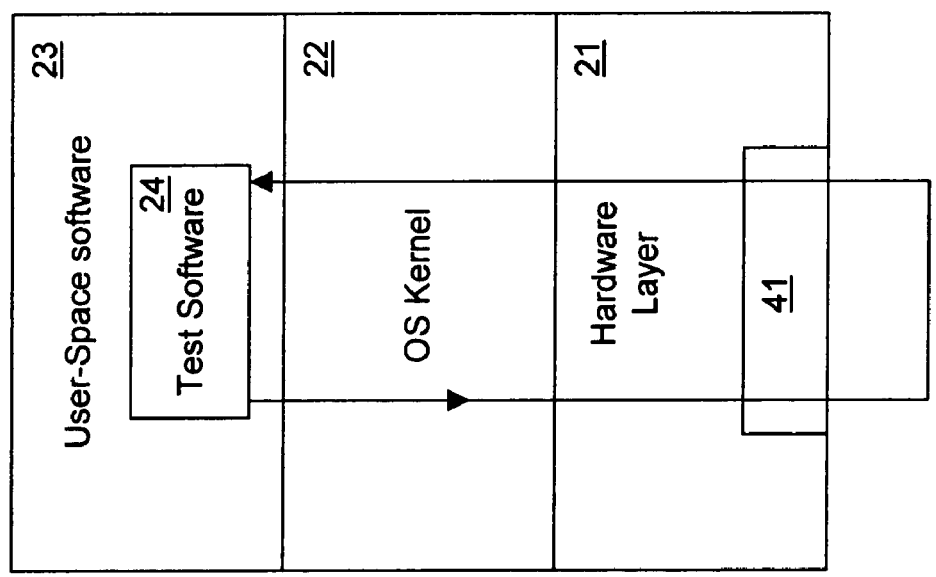
FIG. 4A illustrates a hardware layer loopback test of a network interface device from user-space software.

As mentioned above, it may be desirable to be able to perform loopback testing of the hardware layer 21 of the network interface device 6 from the user-space software layer 23 (e.g., from test software 24). FIG. 4A illustrates this operation. The loopback test is initiated in the test software 24 (e.g., in response to a user command) by the test software 24 creating a test packet, which is passed down to the kernel layer 23. The kernel layer 23 then passes the packet down to the hardware layer 21, which transmits the packet out through the network connection 41 of the network interface device. Assuming a loopback cable is properly connected, the packet should be received back at the network connection 41, provided back up to the kernel layer 22, which then passes the packet back up to the test software 24. The test software 24 then performs a checksum other validation operation to determine whether the received packet matches the sent packet.

As noted above, this process cannot be implemented from user-space software if the kernel layer 22 is a Linux version 2.4 kernel or another kernel that has similar software loopback functionality. This characteristic of the Linux version 2.4 kernel is illustrated in FIG. 4B. If a test packet is generated by the test software 24 and the destination IP address of the packet matches the IP address of the host machine (which would be the case in a loopback test), the kernel 22 will simply return the packet to the test software 24 without passing it down to the hardware layer 21. Accordingly, it has not been possible to perform hardware layer loopback testing of a network interface from user-space software, when using a Linux version 2.4 kernel, without modifying the kernel. The technique introduced herein solves this problem.

To enable a loopback test data packet generated by user-space software to get to the hardware layer, the following operations are performed in accordance with embodiments of the invention:

The destination IP address is changed to something other than the NIC's IP address, so that the packet can be routed out of the NIC.

The source IP address of the packet is changed to something other than the NIC's IP address before the packet is sent out of the NIC, so that when the packet is subsequently received, the IP layer of the kernel does not discard it.

The Ethernet layer is set to promiscuous mode, so that any packets can be received.

The Address Resolution Protocol (ARP) cache is modified to map the Media Access Control (MAC) address to the new IP address;

When the test packet is received back at the NIC, its destination IP is changed to the IP address of the local machine, so that it can be received.

These operations are described in detail below.

Figure 5:
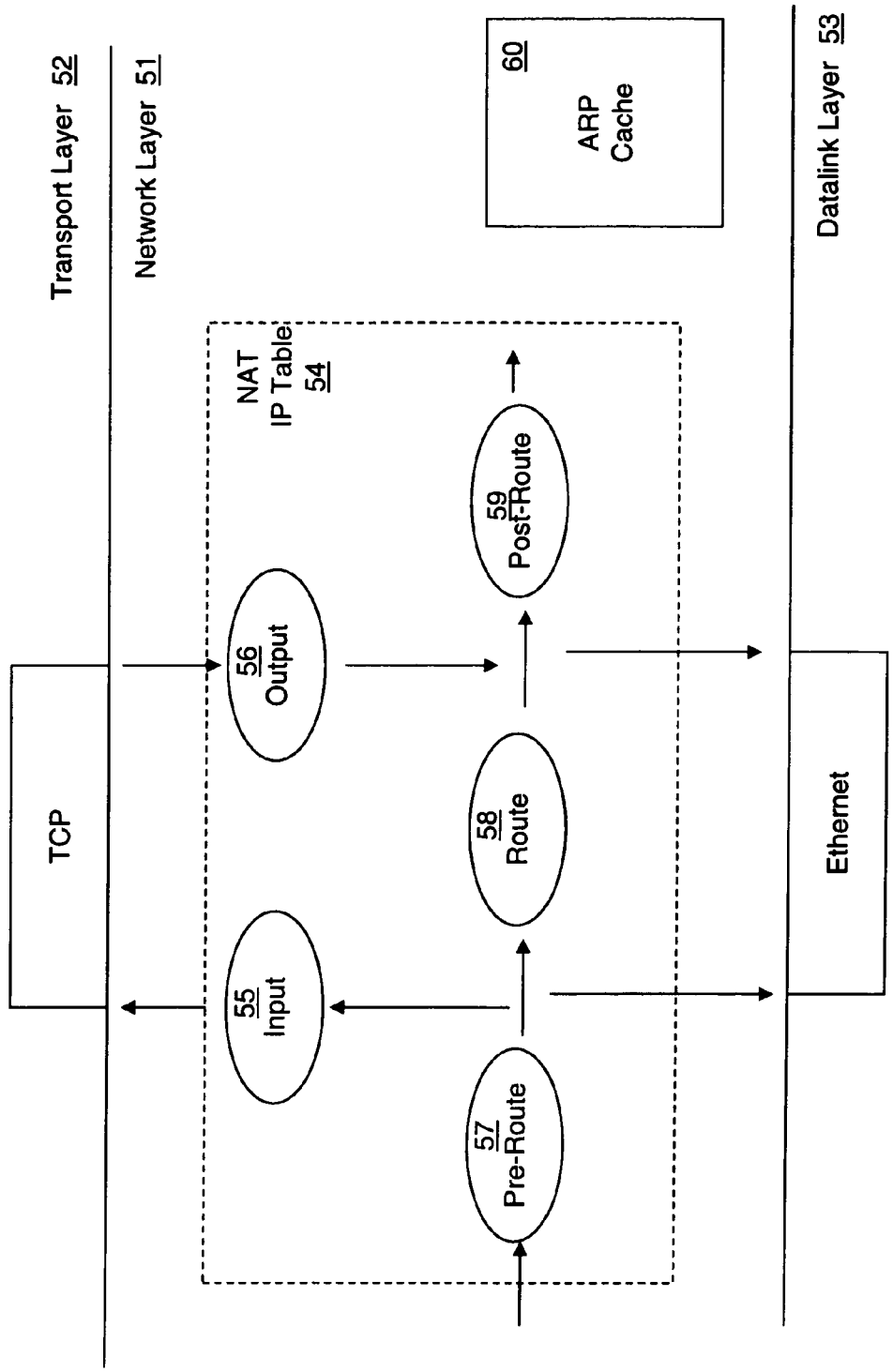
FIG. 5 shows the network layer of the operating system kernel.

For purposes of this description, it is assumed that the operating system kernel used for the hardware layer loopback test is a Linux version 2.4 kernel. To allow the hardware layer loopback test to be performed with this kernel, rules are added to the network address translation (NAT) IP table maintained by the IP layer of the kernel. FIG. 5 shows the network layer of the kernel. For purposes of this description, the network layer 51 of the kernel is assumed to implement IP and therefore is henceforth referred to herein as the IP layer 51.

As shown, the IP layer 51 resides logically between the transport (e.g., TCP) layer 52 and the datalink (e.g., Ethernet) layer 53. The IP layer 51 includes a NAT IP table 54. The NAT IP table 54 includes several "chains", including an input chain 55, an output chain 56, a pre-route chain 57, a route chain 58 and a post-route chain 59. Each of these chains is essentially a set of rules implemented by the IP layer 51. The arrows between these chains in FIG. 5 represent the flow of data through the IP layer 51.

Changing Destination IP Address to Fake IP Address

In order for a loopback test packet to get sent out of the IP layer 51, the destination IP address of the packet is changed from the IP address of the local machine to a fake (dummy) IP address. To make this happen, a rule is added to the output chain 56 in the NAT IP table 54. The output chain 56 is normally used for altering locally generated packets before they get to the routing decision. Hence, a rule is added to the output chain 56 to change the destination IP address from that of the host machine to a fake IP address.

For example, if the IP address of an Ethernet port under test is 172.22.6.166, the destination IP address for a loopback test for the port would be the same. However, a Linux version 2.4 kernel would not allow the packet to get to the hardware layer in this case, since the destination is the same as the source. In order to allow the packet to get passed to the hardware layer under test, the NAT IP table 54 is modified to change the destination IP address to a fake IP address. For example, if the destination IP address is 172.22.6.166, before routing it can be changed to the fake IP address, 20.20.20.20. Note that all of the specific IP addresses mentioned in this description, such as 172.22.6.166 and 20.20.20.20, are only examples used to facilitate explanation; other specific IP addresses could easily be substituted for them.

The following program call to the Linux utility, iptables, can be used to set a rule in the output chain 56 of the NAT IP table 54 to cause this changing of the destination IP address to occur:

iptables -t nat -A OUTPUT -d 172.22.6.166 -j DNAT -to-destination 20.20.20.20
where:
-t nat: means "use NAT"
-A OUTPUT: means "append to the OUTPUT chain"
-d: identifies destination IP address
-j: identifies target of the rule
DNAT: means Destination Network Address Translation (the way to change the destination IP address of a packet)

This command is implemented by the test software 34 before sending the loopback test packet. The result of this command will be the addition of the following rule to the output chain 56 of the NAT IP table 54:

iptables -t nat -L
Chain OUTPUT (policy ACCEPT)
target prot opt source destination
DNAT all - anywhere 172.22.6.166 to 20.20.20.20

As a result of adding this rule to the NAT output chain 56, if the outgoing packet's destination IP address is 172.22.6.166, it will be changed in the IP layer to the fake IP address, 20.20.20.20, as illustrated in FIG. 6.

Changing Source IP Address to the Fake IP Address

Before the test packet is transmitted, the source IP address of the packet must also be changed to a fake IP address (which can be the same IP address as used for the fake destination address, as henceforth assumed herein, although it does not have to be). Doing this prevents the receiving side from dropping the packet. Otherwise, the IP layer 51 might drop the packet, believing that it is coming from a masquerading or malfunctioning host. To accomplish this, therefore, steps are taken to make the receiving side think that the packet is coming from another device. This can be accomplished by adding a rule to the post-routing chain 59 in the NAT IP table 54 to change the matching source IP address. The post-routing chain 59 is used to alter packets just as they are about to leave the network interface device 6.

To explain this further, the previous example is continued. The new rule is: If the source IP address of the test packet matches the IP address of the host machine, 172.22.6.166, change it to the fake IP address, 20.20.20.20.

The following program call to iptables can be used to set a rule in the post-routing chain of the NAT IP table to cause this changing of the source IP address:

iptables -t nat -A POSTROUTING -s 172.22.6.166 -j SNAT -to-destination 20.20.20.20
where:
-t nat: means "use NAT"
-A POSTROUTING: means "append to the POSTROUTING chain"
-s: identifies source IP address
-j: identifies target of the rule
SNAT: means Source Network Address Translation (the way to change the source address of a packet)

This command is implemented by the test software layer 24 before sending the test packet. The result of this command will be the addition of the following rule in the post-routing chain 56 of the NAT IP table 54:

iptables -t nat -L
Chain POSTROUTING (policy ACCEPT)
target prot opt source destination
SNAT all -- 172.22.6.166 anywhere to:20.20.20.20

As a result of adding this rule to the post-routing chain 56, if the outgoing packet's source IP address is 172.22.6.166 (as in the case of a loopback test packet), it will be changed in the IP layer 51 to the fake IP address, 20.20.20.20, as illustrated in FIG. 7.

Setting the NIC to Promiscuous Mode

Setting the network interface device 6 to promiscuous mode will enable it to receive all packets. When the test packet goes through the loopback cable and arrives at the receiving side, its destination address is not the real IP address (the IP address bound to the network interface device 6) because the destination address had been altered earlier in order to send the packet out.

Changing ARP Table Entries to Assign a MAC Address to the Fake IP Address

ARP provides the MAC address of the NIC of a machine to which the local machine is trying to connect, given the target machine's IP address, so that the datalink layer can send out MAC frames for the actual transfer data. ARP is generally implemented in the bottom half of the network layer. ARP can be considered a mechanism for mapping addresses between network layer addresses (e.g., IP addresses) and datalink layer (MAC) physical addresses. For example, the network layer protocol, such as IP, is not aware of 48-bit Ethernet MAC addresses. Likewise the MAC layer protocol, such as Ethernet, is not aware of 32-bit IP addresses. ARP provides a mechanism to map IP addresses to MAC addresses. Referring back to FIG. 5, the operating system kernel 22 stores ARP entries in a temporary memory space called the ARP cache 60, which is essentially a table that cross-references IP addresses with MAC addresses.

The basic operation of ARP is as follows. If the IP layer 51 wants to communicate with another device on the network, it checks the ARP cache 60 to see if the ARP cache 60 includes an entry that matches the IP address to which the IP layer 51 wants to communicate. If there is no matching entry in the ARP cache 60, an ARP broadcast datagram is sent out, which asks, essentially, "Does anybody know whose Ethernet address corresponds to this IP address?" When a response is received, the ARP cache 60 of the sending device is updated, and the original IP layer information is passed on to the datalink (e.g., MAC) layer 53 for processing.

When a loopback test is done according to the technique described herein, the destination IP address is a fake address, so there would be no entry in the ARP cache 60 for the fake IP address to match the MAC address. In order to establish a connection, therefore, it is necessary to add an entry in the ARP cache 60 to match the fake IP address with an appropriate MAC address. Then, when the test packet is sent, the ARP cache 60 will inform the datalink layer 53 that this packet should be sent to the machine's own MAC address. The network interface device 6 then sends the data out, and the loopback cable brings the data back in. The datalink layer 53 circuitry determines that the packet is destined to its own MAC address and, therefore, sends the packet up to the IP layer 51.

Changing Incoming Destination IP Address to Receivers IP Address

In order for the routing table to route the loopback test packet successfully to the receive side, the destination IP address of the packet must be changed back to the receiver's own IP address. The pre-routing chain 57 of the NAT IP table 54 does network address translation on packets before they actually hit the routing decision that sends them onward to the input or forward chains in the filter table. Hence, in accordance with the technique introduced herein, a new rule is added to the pre-routing chain 57, to convert the fake IP address that was previously generated to the actual IP address, so the packet can be correctly routed. Using the previous example, when the test packet is routed by the loopback cable back into the network interface device 6, the packet will have both its source IP address and its destination IP address set to the fake IP address, e.g., 20.20.20.20 in the example above. Assuming that is the case, the pre-routing chain 57 will change the destination address to the socket's real IP address, 172.22.6.166.

The following program call to iptables can be used to set a rule in the pre-routing chain 57 of the NAT IP table 54 to cause this changing of the destination IP address back to the real IP address:

iptables -t nat -A PREROUTING -d 20.20.20.20 -j DNAT -to-destination 172.22.6.166 where:
-t nat: means "use NAT"
-A PREROUTING: means "append to the PREROUTING chain"
-s: identifies source IP address
-j: identifies target of the rule
DNAT: means Destination Network Address Translation This command is implemented by the test software 24 before sending the test packet. The result of this command will be the addition of the following rule in the pre-routing chain of the NAT IP table:

iptables -t nat -L
Chain PREROUTING (policy ACCEPT)
target prot opt source destination
DNAT all -- 20.20.20.20 anywhere to: 172.22.6.166

As a result of adding this rule to the NAT pre-routing chain 57, if the incoming packet's destination IP address is 20.20.20.20 (as in the case of a loopback test packet), it will be changed in the network layer (e.g., IP layer) 51 back to the real IP address, 172.22.6.166, as illustrated in FIG. 8.

Figure 9:
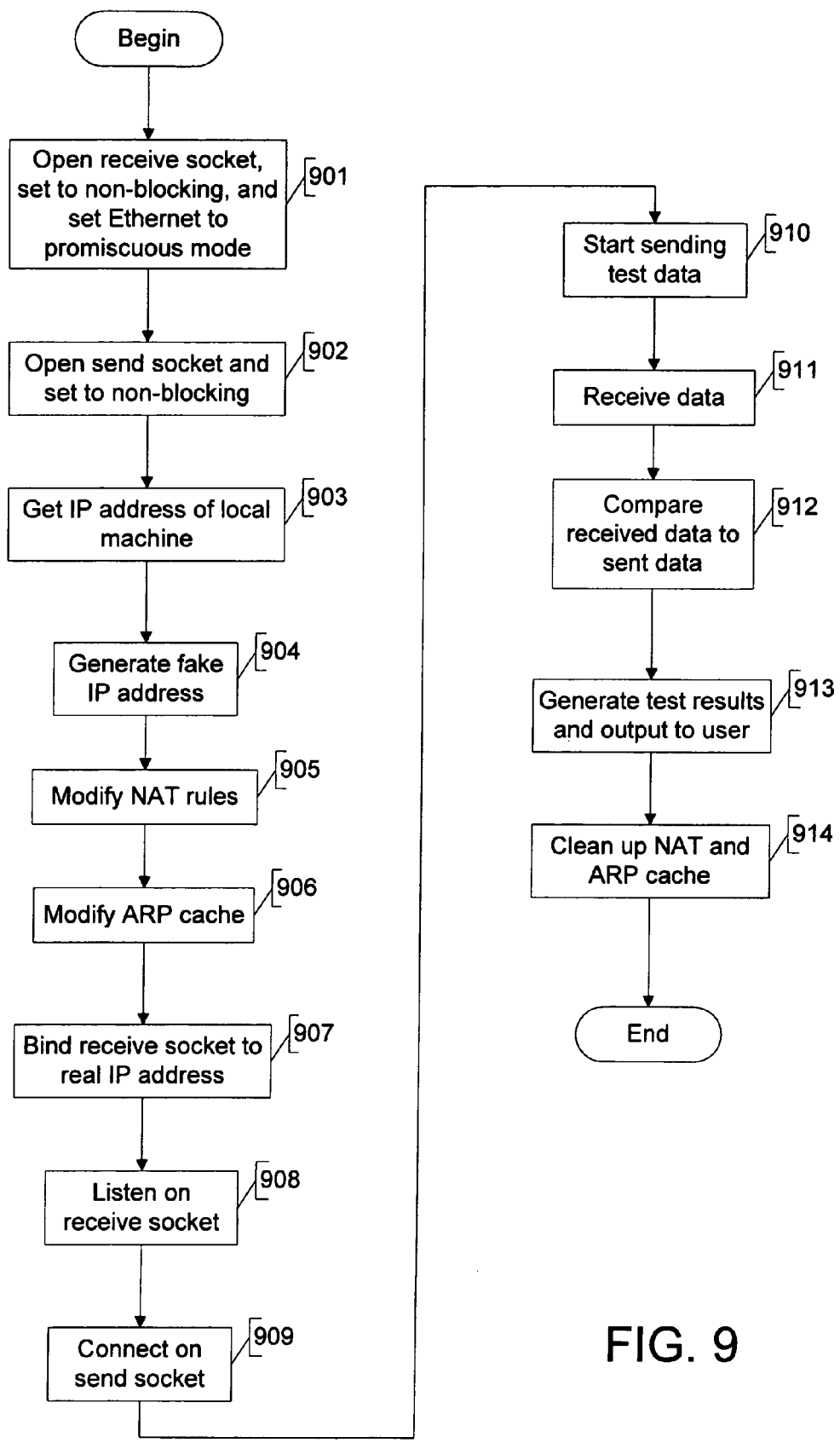
FIG. 9 shows an overall process for performing a hardware layer loopback test of a NIC, in accordance with embodiments of the invention.

FIG. 9 shows an overall process for performing a hardware layer loopback test of a network interface device 6, in accordance with the technique introduced herein. The described operations are executed by user-space software layer (e.g., test software 24). Initially, at 901 the user-space software opens a receive socket, sets it to non-blocking mode (i.e., the program will return immediately and not wait for a response to the test packet), and sets Ethernet to promiscuous mode. Next, at 902 the user-space software opens a send socket and sets it to non-blocking mode. The user-space software then determines the IP address of the local machine at 903 and generates a fake IP address at 904, to be used as described above. The user-space software then modifies the NAT IP table rules at 905 as described above and modifies the ARP cache at 906 as described above. The user-space software then binds the receive socket to the real IP address of the local machine at 907, starts listening on the receive socket at 908, and connects on the send socket at 909. The user-space software then starts sending test data packets over the send socket at 910. Data is then received through the receive socket at 911 (assuming there is no problem with the NIC which would prevent that). The user-space software then compares the received data to the transmitted data at 912 and generates an output indicating the result to the user at 913. Finally, at 914 the user-space software layer reverses the changes that were made to the NAT IP table and the ARP cache.

Note that the loopback technique introduced above also can be applied to other applications. An example of such another application is bit error rate testing (BERT). Commercially available BERT systems are typically complex systems. By providing additional circuitry in the NIC to analyze data communication between the MAC and the PHY, the loopback technique introduced above can be used to send, receive and analyze datalink layer traffic from a user-space program. This would allow for portable software BERT systems that can be run on a desktop computer running Linux, for example, thereby saving engineering time and money.

Another possible application of the loopback technique introduced above is in Ethernet frame traffic analysis. As with BERT systems, with some additional hardware in the NIC, data sent to the NIC can be modified to contain information about Ethernet frame traffic passing through the NIC. Using the loopback technique introduced above would allow the use of a user-space Ethernet traffic analyzer that can be run on a desktop computer.

Thus, a method and apparatus to perform hardware layer loopback testing of a network interface device from a user-space program have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    initiating at a network interface device a loopback test of a datalink layer of the network interface device from a user-space software layer of the network interface device, including generating a test packet having a source and a destination address associated with the network interface device, where the datalink layer and the user-space software layer are layers of a network stack on the network interface device;
    transmitting the test packet from the user-space software layers of the network interface device through the datalink layer of the network interface device and out a network connection external to the network interface device;
    receiving the transmitted test packet at the network interface device; and
    determining at the user-space software layer a result of the loopback test of the datalink layer of the network interface device by determining whether the received test packet matches the generated test packet.

2. A method as recited in claim 1, wherein initiating the loopback test comprises passing loopback test data from the user-space software layer to a Linux based operating system kernel to initiate the loopback test.

3. A method as recited in claim 1, wherein the datalink layer comprises an Ethernet layer.

4. A method as recited in claim 1, wherein:
    the user-space software layer operates over a Linux based operating system kernel to initiate and determine the result of the loopback test;
    the datalink layer is an Ethernet layer; and
    the loopback test further includes a loopback test of a physical layer of the network interface device.

5. A method as recited in claim 1, wherein:
    initiating the loopback test comprises providing the test packet to an operating system kernel of the network interface device, for transmission by the network interface device, where the system kernel determines whether a destination address of an egress packet is the address of the network interface device and prevents hardware loopback of the egress packet.

6. A method as recited in claim 5, wherein the operating system kernel is a Linux based operating system kernel.

7. A method as recited in claim 5, further comprising, in the kernel, and prior to transmission of the test packet by the network interface device:
    changing a destination network address of the test packet from an address that corresponds to the network interface device to a predetermined destination network address; and
    changing the source network address of the test packet from an address that corresponds to the network interface device to a predetermined source network address.

8. A method as recited in claim 7, further comprising, prior to transmission of the test packet by the network interface device:
    mapping the predetermined destination network address to a media access control (MAC) address of the network interface device.

9. A method as recited in claim 7, further comprising:
    if a destination network address of the received packet is set to the predetermined destination network address, then in the kernel layer, changing the destination network address of the received packet to the destination network address which corresponds to the network interface device.

10. A method as recited in claim 5, wherein the network interface device includes an operating system kernel, the method further comprising:
    modifying a set of communication rules used by a network layer of the kernel, to cause a source network address and a destination network address of the test packet to be changed from a network address of the network interface device to a predetermined network address.

11. A method as recited in claim 10, further comprising:
    creating a mapping entry, for use by the network layer, to map the predetermined destination network address to a media access control (MAC) address of the network interface device.

12. A method of enabling testing of a network interface device, the network interface device including an operating system kernel which includes a network layer, the method comprising:
    modifying a set of communication rules used by the network layer of the operating system kernel, so that the modified communication rules specifying
        for a packet received by the network layer from a user-space software layer of the network interface device having a source network address and a destination network address of the packet set to a network address of the network interface device, the network layer changing the destination network address of the packet to a predetermined destination network address and changing the source network address of the packet to a predetermined source network address, and
        for a packet received by the network interface device from an external connection and the packet having a destination network address set to the predetermined destination network address, the network layer changing the destination network address of the received packet to the network address of the network interface device; and
    creating a mapping entry, for use by the network layer, to map the predetermined destination network address to a media access control (MAC) address of the network interface device.

13. A method as recited in claim 12, further comprising:
generating, in the user-space software layer, a test packet for transmission by the network interface device, the test packet having a source network address and a destination network address both set to the network address of the network interface device;
causing the test packet to be transmitted by the network interface device through an external network connection;
receiving the test packet at the user-space software layer after the packet has been transmitted by the network interface device through an external network connection and then subsequently received through the external network connection; and
determining, in the user-space software layer, whether the test packet has been received by the network interface device as transmitted.

14. A method as recited in claim 12, wherein the operating system kernel is a Linux based kernel.

15. A method as recited in claim 12, wherein the network layer is an Internet Protocol (IP) layer.

16. A method as recited in claim 15, wherein the source network address and the destination address are IP addresses.

17. A method as recited in claim 15, wherein the network interface device further includes an Ethernet datalink layer.

18. A method as recited in claim 12, wherein modifying the set of rules used by the network layer comprises modifying a network address translation table of the network layer.

19. A method as recited in claim 18, wherein modifying the network address translation table of the network layer comprises modifying an output chain, a post-routing chain and a pre-routing chain of the network address translation table.

20. A method as recited in claim 12, wherein the network interface device further includes a datalink layer, the method further comprising setting the datalink layer to operate in a promiscuous mode, before the test packet is transmitted by the network interface device.

21. A method of testing a network interface device, the method comprising:
generating a test packet in a user-space software layer of the network interface device, the test packet having a source network address and a destination network address which both correspond to the network interface device;
providing the received packet from the user-space software layer to an operating system kernel of the network interface device;
in the operating system kernel,
changing the destination network address of the test packet to a predetermined destination network address not associated with the network interface device, and
changing the source network address of the test packet to a predetermined source network address not associated with the network interface device;
transmitting the test packet from the network interface device through an external connection;
receiving a packet at the network interface device subsequent to said transmitting; and
if a destination network address of the received packet is set to the predetermined destination network address, then changing the destination network address of the received packet to the destination network address which corresponds to the network interface device.

22. A method as recited in claim 21, wherein each of the predetermined destination network address and the predetermined source network address is a fake network address.

23. A method as recited in claim 21, further comprising:
providing the received packet to the user-space software layer after changing the destination network address of the received packet to the destination network address which corresponds to the network interface device; and
using the received packet in the user-space software layer to generate a test result.

24. A method as recited in claim 23, further comprising mapping the predetermined destination network address to a media access control (MAC) address of the network interface device.

25. A method as recited in claim 21, wherein the operating system kernel is a Linux based kernel.

26. A method as recited in claim 21, wherein the network layer is an Internet Protocol (IP) layer, and wherein the source network address and the destination address are IP addresses.

27. A method as recited in claim 26, wherein the datalink layer is an Ethernet layer.

28. A method as recited in claim 26, the method further comprising setting the datalink layer to operate in a promiscuous mode prior to transmitting the test packet.

29. A method of performing a hardware loopback test of a network interface device, the network interface device including a Linux based operating system kernel that determines whether a destination address of an egress packet is the address of the network interface device and prevents hardware loopback of the egress packet, and a datalink layer, the operating system kernel including an IP layer, the method comprising:
setting the datalink layer to operate in a promiscuous mode prior to transmitting the test packet to cause the network interface device to accept all ingress packets, regardless of destination network address;
generating a test packet in a user-space software layer, the test packet having a source network address which corresponds to the network interface device and a destination network address which corresponds to the network interface device;
providing the received packet from the user-space software layer to the IP layer;
in the IP layer of the network interface device,
changing the destination network address of the test packet to a predetermined destination network address not associated with the network interface device;
changing the source network address of the test packet to a predetermined source network address not associated with the network interface device, and
mapping the predetermined destination network address to a media access control (MAC) address of the network interface device;
providing the test packet from the IP layer to the datalink layer;
transmitting the test packet from the network interface device through an external connection;
receiving a packet at the network interface device subsequent to said transmitting; and
if a destination network address of the received packet is set to the predetermined destination network address, then in the IP layer, changing the destination network address of the received packet to the destination network address which corresponds to the network interface device;
providing the received packet to the user-space software layer; and
determining, in the user-space software layer, whether the received packet matches the test packet.

30. An apparatus to test a network interface device, the apparatus comprising:
- a processor;
- a network physical layer of the network interface device, including a physical network connection;
- a datalink layer of the network interface device;
- an operating system kernel; and
- a user-space software layer, logically above the operating system kernel, to control operation of the processor, the user-space software layer configured to
    - initiate a loopback test of the datalink layer and the physical layer of the network device, including generating a test packet having a source and a destination address associated with the network interface device,
    - transmit the loopback packet from the user-space software layer of the network interface device through the datalink layer of the network interface device and through a physical layer over a network connection external to the network interface device, and
    - determine a result of the loopback test by determining whether a packet received subsequently to sending the test packet matches the test packet.

31. An apparatus as recited in claim 30, wherein the operating system kernel is a Linux based kernel.

32. An apparatus as recited in claim 30, wherein the datalink layer is an Ethernet layer.

33. An apparatus as recited in claim 30, wherein the operating system kernel is a Linux based kernel and the datalink layer is an Ethernet layer.

34. An apparatus as recited in claim 30, wherein:
- the user-space software layer is configured to initiate the loopback test by providing the test packet to the operating system kernel, for transmission through the physical network connection.

35. An apparatus as recited in claim 34, wherein the operating system kernel is a Linux based kernel.

36. An apparatus as recited in claim 34, wherein the kernel is configured to, prior to transmission of the test packet:
- change a destination network address of the test packet from an address that corresponds to the network interface device to a predetermined destination network address; and
- change the source network address of the test packet from an address that corresponds to the network interface device to a predetermined source network address.

37. An apparatus as recited in claim 36, wherein the kernel is further configured to, prior to transmission of the test packet:
- map the predetermined destination network address to a media access control (MAC) address of the network interface device.

38. An apparatus as recited in claim 37, wherein the kernel is further configured to:
- if a destination network address of the received packet is set to the predetermined destination network address, change the destination network address of the received packet to the destination network address which corresponds to the network interface device.

39. An apparatus as recited in claim 36, wherein the operating system kernel includes a network layer, and wherein the kernel is configured to, prior to transmission of the test packet:
- modify a set of communication rules used by the network layer, to cause a source network address and a destination network address of the test packet to be changed from a network address of the network interface device to a predetermined network address.

40. An apparatus as recited in claim 39, wherein the kernel is configured to, prior to transmission of the test packet:
- create a mapping entry, for use by the network layer, to map the predetermined destination network address to a media access control (MAC) address of the network interface device, for use by the datalink layer.

41. A network interface device comprising:
- a processor;
- a network physical layer, including a physical network connection, coupled to the processor;
- a datalink layer;
- an operating system kernel that determines whether a destination address of an egress packet is the address of the network interface device and prevents hardware loopback of the egress packet; and
- a user-space software layer, logically above the operating system kernel, to control operation of the processor, the user-space software layer configured to
    - initiate a loopback test of the datalink layer and the physical layer, by generating a test packet having a source and a destination address associated with the network interface device and to provide the test packet to the operating system kernel, for transmission through the physical layer,
    - transmit the loopback packet from the user-space software layer of the network interface device through the datalink layer of the network interface device and through a physical layer over a network connection external to the network interface device, and
    - determine a result of the loopback test by determining whether a packet, received by the network interface device after the test packet has been transmitted through the physical layer, matches the test packet.

42. A network interface device as recited in claim 41, wherein the operating system kernel is a Linux based kernel.

43. A network interface device as recited in claim 41, wherein the operating system kernel is a Linux based kernel and the datalink layer is an Ethernet layer.

44. A network interface device as recited in claim 41, wherein the user-space software layer is configured to:
- cause a network layer of the kernel to change a destination network address of the test packet from an address that corresponds to the network interface device to a predetermined destination network address, prior to transmission of the test packet; and
- cause the network layer to change the source network address of the test packet from an address that corresponds to the network interface device to a predetermined source network address, prior to transmission of the test packet.

45. A network interface device as recited in claim 44, wherein the user-space software layer is configured to:
- cause the network layer to map the predetermined destination network address to a media access control (MAC) address of the network interface device, prior to transmission of the test packet.

46. A network interface device as recited in claim 45, wherein the user-space software layer is configured to:
- cause the network layer to change a destination network address of the received packet to the destination network address which corresponds to the network interface device, if the destination network address of the received packet is set to the predetermined destination network address.

* * * * *